(12) United States Patent
Mills et al.

(10) Patent No.: US 6,363,182 B2
(45) Date of Patent: Mar. 26, 2002

(54) OPTICAL SWITCH FOR RECIPROCAL TRAFFIC

(76) Inventors: James D. Mills, 2 Nottingham Dr., Wilmington, MA (US) 01887; Philip J. Lin, 11 June La., Newton, MA (US) 02459; Roger P. Holmstrom, 2711 Royal St. James, St. Charles, IL (US) 60174

( * ) Notice: Subject to any disclaimer, the term of this patent is extended or adjusted under 35 U.S.C. 154(b) by 0 days.

(21) Appl. No.: 09/799,954

(22) Filed: Mar. 6, 2001

Related U.S. Application Data

(60) Provisional application No. 60/221,796, filed on Jul. 31, 2000.

(51) Int. Cl.$^7$ .............................. G02B 6/42; H04J 14/06
(52) U.S. Cl. .............................. 385/17; 385/16; 385/24; 359/117; 359/139
(58) Field of Search .............................. 385/17, 16, 18, 385/20, 21, 24; 359/117, 139, 128, 119

(56) References Cited

U.S. PATENT DOCUMENTS

| | | |
|---|---|---|
| 3,823,401 A | 7/1974 | Berg et al. |
| 4,038,497 A | 7/1977 | Collins et al. |
| 4,239,329 A | 12/1980 | Matsumoto |
| 4,289,373 A | 9/1981 | Sugimoto et al. |
| 4,493,113 A | 1/1985 | Forrest et al. |
| 4,684,796 A | 8/1987 | Johnson |
| 4,787,692 A | 11/1988 | Spanke |
| 4,846,542 A | 7/1989 | Okayama et al. |
| 4,889,404 A | 12/1989 | Bhagavatula et al. |
| 5,009,477 A | 4/1991 | Alferness et al. |
| 5,048,910 A | 9/1991 | Caron |
| 5,077,483 A | 12/1991 | Cloonan et al. |
| 5,146,358 A | 9/1992 | Brooks |
| 5,255,332 A | 10/1993 | Welch et al. |
| 5,272,555 A | 12/1993 | Suzuki |
| 5,274,487 A | 12/1993 | Fujimoto et al. |
| 5,301,008 A * | 4/1994 | Huang et al. .............. 385/16 X |
| 5,343,314 A | 8/1994 | Nakamura et al. |
| 5,359,683 A | 10/1994 | Pan |
| 5,408,350 A | 4/1995 | Perrier et al. |
| 5,416,662 A | 5/1995 | Kurasawa et al. |
| 5,469,277 A | 11/1995 | Kavehrad et al. |
| 5,471,340 A | 11/1995 | Cheng et al. |
| 5,552,918 A | 9/1996 | Krug et al. |
| 5,588,078 A | 12/1996 | Cheng et al. |
| 5,608,565 A | 3/1997 | Suzuki et al. |

(List continued on next page.)

FOREIGN PATENT DOCUMENTS

DE        33 35 128 A1    4/1985

OTHER PUBLICATIONS

Hirabayashi et al. "Optical Beam Direction Compensating System for Board–to–Board Free Space Optical Interconnection in High–Capacity ATM Switch", Lightwave Technology, Journal of, vol.: 15, May 1997, pp. 874–882.*

Yamaguchi et al. "High–density free–space photonic switching fabrics", IEEE, vol. 1, 1995, pp. 61–62.*

U.S. application No. 09/143,335, Lin et al., filed Sep. 4, 1998.

U.S. application No. 09/322,337, Magill et al., filed May 28, 1999.

*Primary Examiner*—Phan T. H. Palmer
(74) *Attorney, Agent, or Firm*—Rockey, Milnamow & Katz, Ltd.

(57) ABSTRACT

A reduced component optical switch module includes a plurality of ports wherein each port includes an optical input and an optical output. A plurality of switchable deflectors in combination with a plurality of non-switchable deflectors can be used to establish transmission paths between pairs of ports to support traffic reciprocity. In one embodiment, the ports and switchable elements are configured so as to provide substantially constantly transmission paths within the respective module. In another embodiment, additional deflector elements can be provided to implement loop-back functionality at one or more of the ports.

43 Claims, 3 Drawing Sheets

U.S. PATENT DOCUMENTS

| | | |
|---|---|---|
| 5,623,562 A | 4/1997 | Anderson et al. |
| 5,648,963 A | 7/1997 | Mayake et al. |
| 5,652,813 A | 7/1997 | Wilson |
| 5,663,818 A | 9/1997 | Yamamoto et al. |
| 5,680,234 A | 10/1997 | Darcie et al. |
| 5,712,932 A | 1/1998 | Alexander et al. |
| 5,729,642 A | 3/1998 | Thaniyavarn |
| 5,734,763 A | 3/1998 | Chang |
| 5,739,933 A | 4/1998 | Dembeck et al. |
| 5,742,717 A | 4/1998 | Saitoh |
| 6,282,336 B1 * | 8/2001 | Riza .............................. 385/21 |
| 6,292,281 B1 * | 9/2001 | Bala et al. ..................... 385/18 |

* cited by examiner

OPTICAL SWITCH FOR RECIPROCAL TRAFFIC

The benefit of the earlier filing date of Provisional Application Serial No. 60/221,796, filed Jul. 31, 2000 is hereby claimed.

FIELD OF THE INVENTION

The invention pertains to optical switches. More particularly, the invention pertains to such switches having reduced numbers of switchable transmission path defining elements.

BACKGROUND OF THE INVENTION

Known forms of switched optical communication systems incorporate fiberoptics as a medium for communicating messages carried by modulated beams of radiant energy. Such messages at times need to be switched between optical fibers. One known form of optical switch is a crossbar switch.

Known optomechanical crossbar switches use moving mirrors to create connections between inputs and outputs. Various mechanisms can be used to switch or move the mirrors or otherwise to cause them to be actuated and to be in a state to create a connection.

FIG. 1 illustrates a known optical crossbar switch module 10 having four inputs and four outputs. Such switch modules receive a plurality of modulated light beams to be switched at input ports such as ports 12-1, 12-2, 12-3, 12-4 . . . 12-N. Switched light beams exit module 10 at output ports 14-1, 14-2, . . . 14-N.

The rectangles inside module 10 represent mirrors. The gray rectangle 16 is a fixed mirror. The dashed rectangles 20a–20k are non-actuated mirrors. Non-actuated mirrors permit beams to pass without substantial deflection. The black rectangles 22a–22d are actuated mirrors. Actuated mirrors substantially deflect incident beams.

In the example of FIG. 1, input ports 12-1, 12-2, 12-3, and 12-4 are coupled to output ports 14-2, 14-3, 14-4, and 14-1, respectively. Actuating the appropriate correct set of mirrors enables the switch to make all connection permutations.

Lenses, such as lens 18a, at the inputs and outputs of switch module 10 keep the light beams collimated while traversing the free space inside the optical switch. Fibers provide inputs to and transmit outputs from the switch 10 and they are precisely aligned to the collimating lenses. The number of switchable mirrors required in this architecture is $N^2-1$.

SUMMARY OF THE INVENTION

A reduced component non-blocking optical switch, or switch module, which supports all traffic that qualifies as reciprocal traffic, includes a plurality of optical ports. Each port has an optical input and optical output associated therewith. The ports couple incident communication beams, such as incident light beams, into a switching region within the switch. Transmission paths established within the switch support reciprocal traffic. Transmission paths can include free space, optical fibers or waveguides.

In one embodiment, a plurality of fixed mirrors or deflectors is positioned substantially diagonally within the switch at optical cross points. The fixed deflectors are located at cross points in the switch where the transmission paths exhibit 90° angles and are oriented at 45° relative to the transmission paths. Other cross points within the switch are occupied by switchable deflectors or mirrors which can be switched to complete respective paths. By combining both fixed and switchable deflector elements, transmission paths can be established between selected pairs of ports thereby supporting the reciprocal traffic.

In another aspect, the ports can be staggered relative to the deflectors so that the path lengths between pairs of ports are substantially constant. In yet another embodiment, some or all of the fixed deflectors can be replaced with combinations of a switchable deflector and a fixed path reversing deflector, such as a V-shaped mirror, to provide loop-back functionality for selected of the ports.

In yet another aspect, deflectors can be implemented as fixed or movable mirrors, or alternately instead of movable mirrors, fixed mirrors with movable mechanical optical deflectors. Solid state deflectors can be used as an alternate.

In one aspect, deflectors can be implemented as optical bubbles using internal reflections or holographic gratings.

Switch modules in accordance herewith can be combined in various configurations to implement multi-stage switches. In one embodiment, non-blocking multi-stage switches can be implemented using, in part, multiple switch modules in accordance herewith to facilitate reciprocal traffic.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
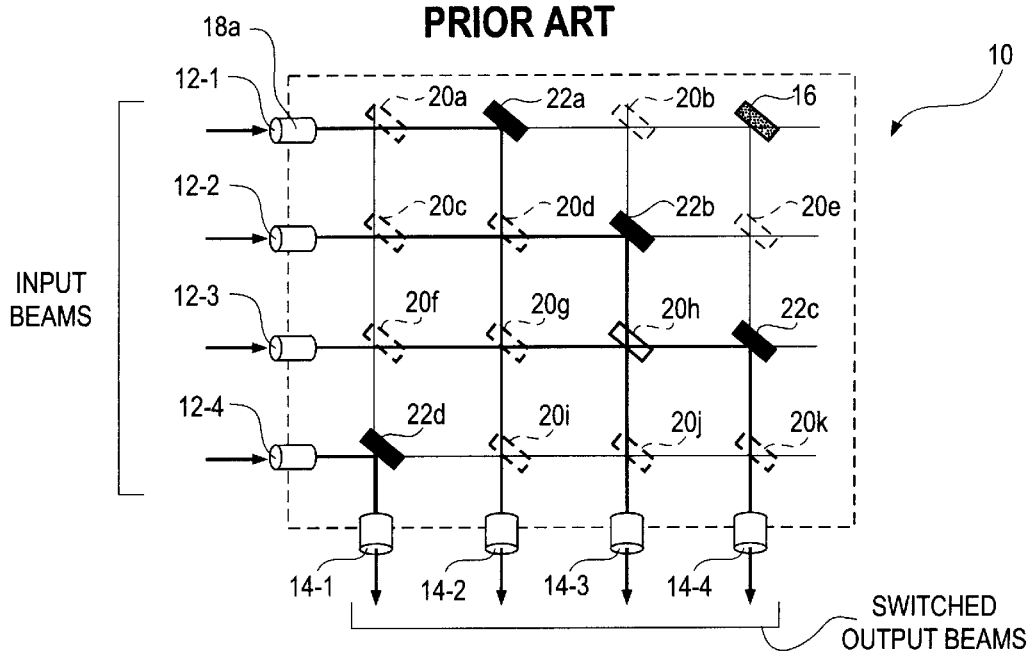
FIG. 1 is a diagram illustrating a prior art crossbar switch.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

In telecommunication applications, a condition called traffic reciprocity often exists. Traffic reciprocity is defined as the condition where input B is connected to output A whenever input A is connected to output B.

The exemplary connections illustrated in FIG. 1 do not correspond to reciprocal traffic. Specifically, input 1 is connected to output 2 whereas input 2 is not connected to output 1 as required by the definition of reciprocal traffic.

Because the module 10 supports all traffic connections (both reciprocal and non-reciprocal), it provides greater flexibility than is required in applications where traffic reciprocity exists. The price of this flexibility is the requirement to have $N^2-1$ switchable deflectors or mirrors for an N×N switch.

By exploiting the presence of traffic reciprocity, an exemplary 4×4 (N=4) switch module 10a as in FIG. 2, described below exhibits reduced switch complexity as compared to the crossbar switch of FIG. 1. Switch module 10a includes input/output ports 28-1, -2, -3 . . . -N. Each port is coupled to at least one source medium, such as an input optical fiber and at least one destination medium, an output fiber.

It will be understood that module 10a could be operated under the control of control circuits 10a-1. These control circuits could be part of a larger communications system without departing from the spirit and scope of the present invention. It will also be understood that multiple reciprocal-traffic switches, such as module 10a, can be included in larger single or multiple stage switches.

Figure 2:
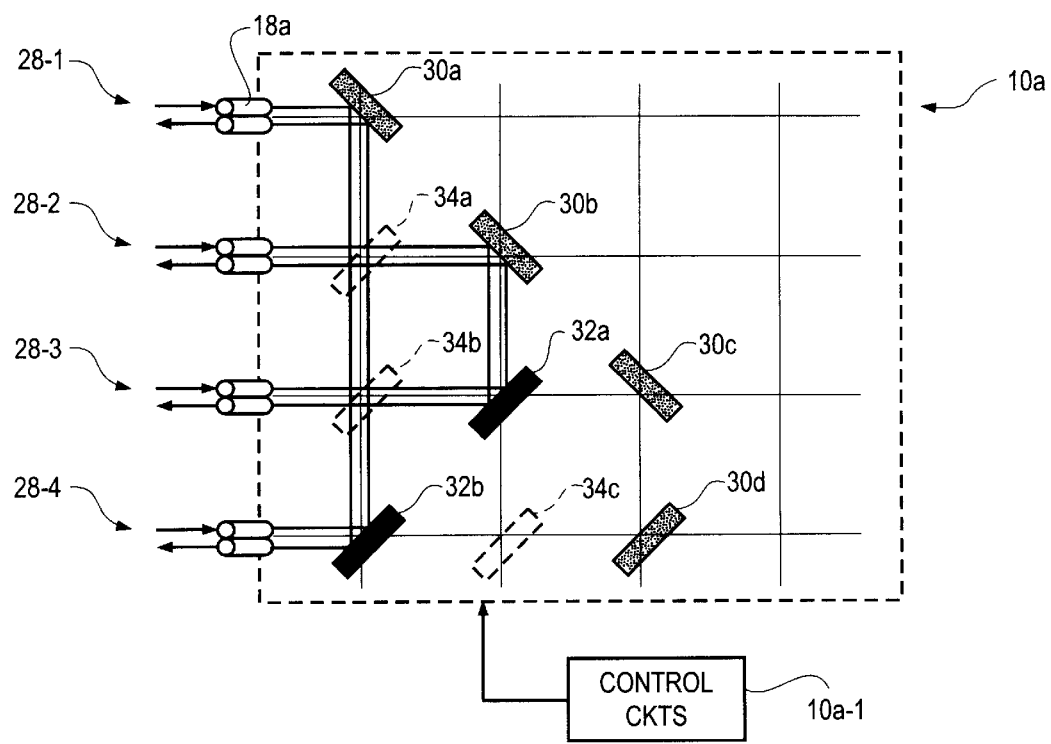
FIG. 2 is a diagram illustrating a reduced component switch in accordance with the present invention.

When reciprocity exists, the inputs and outputs can be co-located and paired as illustrated in FIG. 2. It will also be understood that each input/output port, such as 28-i, can be coupled to an input optical fiber and an output optical fibre. Alternately, a single coupled fiber could be used to carry bidirectional traffic.

For an N×N switch, the gray rectangles 30a, b, c . . . N denote fixed deflectors or mirrors. They always deflect an incident beam. Black rectangles 32a, b denote actuated deflectors or mirrors and dashed rectangles 34a, b, c denote non-actuated deflectors or mirrors. Deflectors 32a, b and 34a, b, c are all switchable between states.

FIG. 2 illustrates an example where port 28-1 is coupled optically to port 28-4 and port 28-2 is coupled optically to port 28-3. The forward path and the reverse path of the reciprocal traffic are deflected off the same deflectors or mirrors.

Assume a pair of reciprocal connections is to be made between input number A and number B where A<B. Then the two deflectors used for this pair of paths are the fixed deflector or mirror in row A and the actuated deflector or mirror in row B in column A.

Although FIG. 2 illustrates a 4×4 switch 10a, this architecture can be extended to an N×N switch module. The required number of switchable deflectors or mirrors is $\{N*(N-1)/2\}-1$. This is about half as many as those used by the crossbar module 10.

Figure 3:
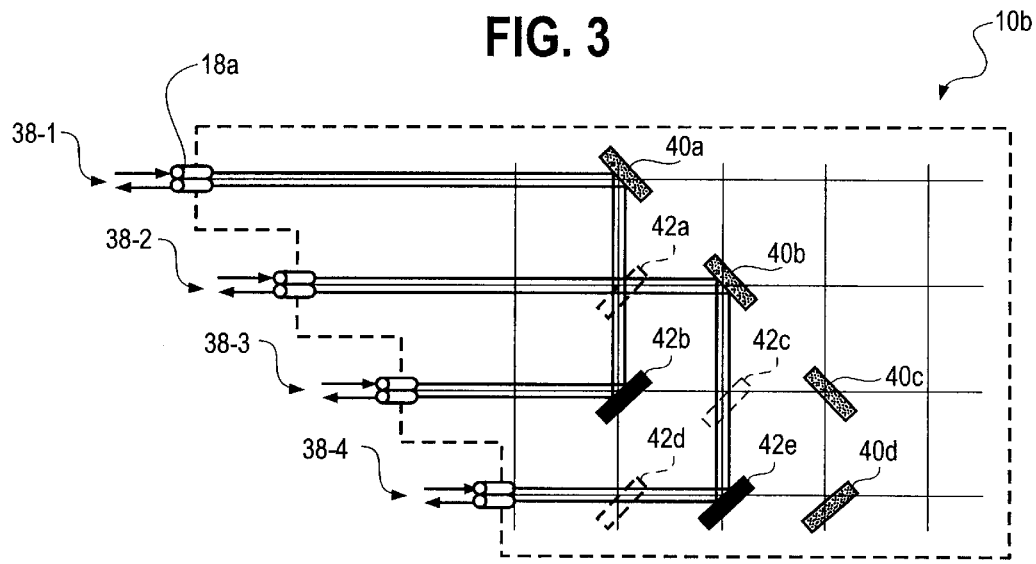
FIG. 3 is a diagram illustrating an alternate configuration of the switch of FIG. 2.

An improvement can be made to the switch 10a using staggered input and output ports 38-1, -2, -3 . . . -N as illustrated by switch 10b, FIG. 3. In FIG. 2, the path lengths of the paths are of unequal length. Path lengths are directly related to the amount of loss an optical signal incurs. The loss is due to the divergence of the light. The light diverges even in the presence of good collimating lenses. Therefore, it is desirable to make all path lengths equal, regardless of connection, in order to reduce the variability in insertion loss.

Switch 10b, FIG. 3 provides equal path lengths. In FIG. 3, fixed and switchable deflectors are represented using the same conventions as used in FIG. 2. Deflectors 40a, b, c, d are fixed. Remaining deflectors 42a, b, c, d, e are switchable.

As illustrated in FIG. 3, ports 38-1 and 38-3 are coupled together, and ports 38-2 and 38-4 are coupled together. These respective path lengths are of substantially the same length. Pairs of staggered input and output ports create equal length light paths, for example the connection between ports A and B where A<B. The deflectors used are the fixed deflectors on row A and the actuated deflector or mirror on row B. The fixed deflector or mirror is N units away from the input to port A. The actuated deflector or mirror is N−B+A units away from an input to port B. The distance between the two deflectors or mirrors is B−A. Therefore, the total length, in free space, of the light path is N+(N−B+A)+(B−A)=2N which, is independent of the particular choice of A and B.

Figure 4:
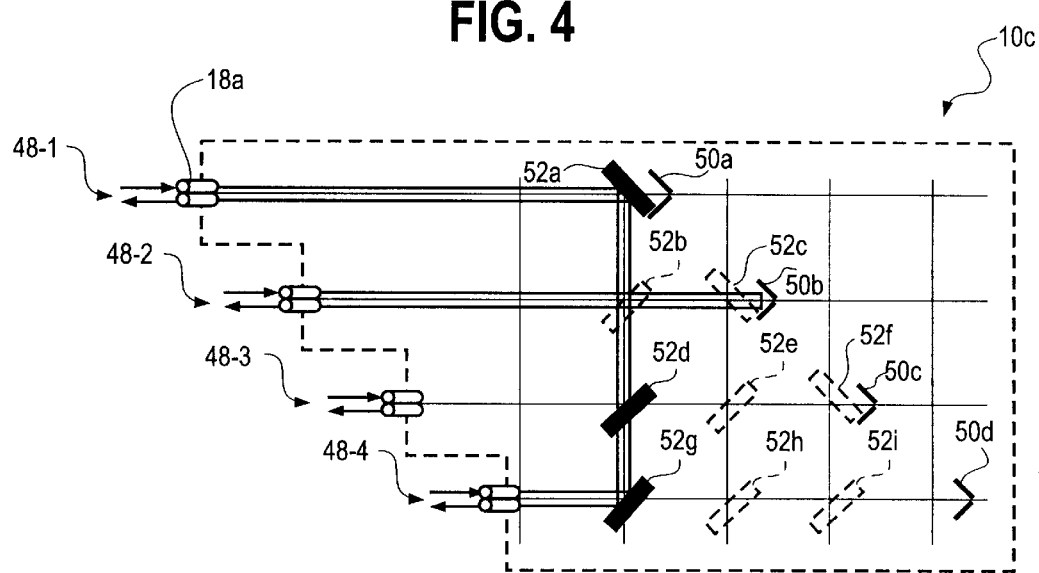
FIG. 4 is a diagram illustrating yet another configuration of the switch of FIG. 2.

In another embodiment, switch 10c, FIG. 4, can be modified to include a loop-back function. Loop-back is present when an input at a port is to be coupled with the corresponding output at the same port.

Adding a fixed deflector, such as a V-shaped mirror at the end of each row, such as deflectors 50a, b, c, d, provides a loop-back function. Deflectors 52a, b, c . . . i are switchable. In this embodiment, the constant path length property of module 10b is almost preserved with the exception that loop-back paths are slightly longer.

As illustrated in FIG. 4, ports 48-1 and 48-4 are coupled together. Port 48-2 is looped-back on itself. Port 48-3 is unused.

The number of switchable deflectors or mirrors for an N×N switch as in FIG. 4 is $\{N(N+1)/2\}-1$. This is slightly larger than the number used by the switch 10a of FIG. 2 without loop-back. However, it is still approximately one/half the number required by the switch 10.

There are a variety of possible physical implementations. The deflectors or mirrors can move in and out of position by using either a sliding or tilting mechanism. They could be non-moving multi-state solid state deflectors. The input and output fibers should be rested on V-grooves for better alignment with the collimating lenses. The lenses, deflectors or mirrors, and v-grooves may all be part of a MEMS (micro-electromechanical systems) platform. It will be understood that the details of implementation of the various deflectors or mirrors are not limitations of the present invention.

Figure 5:
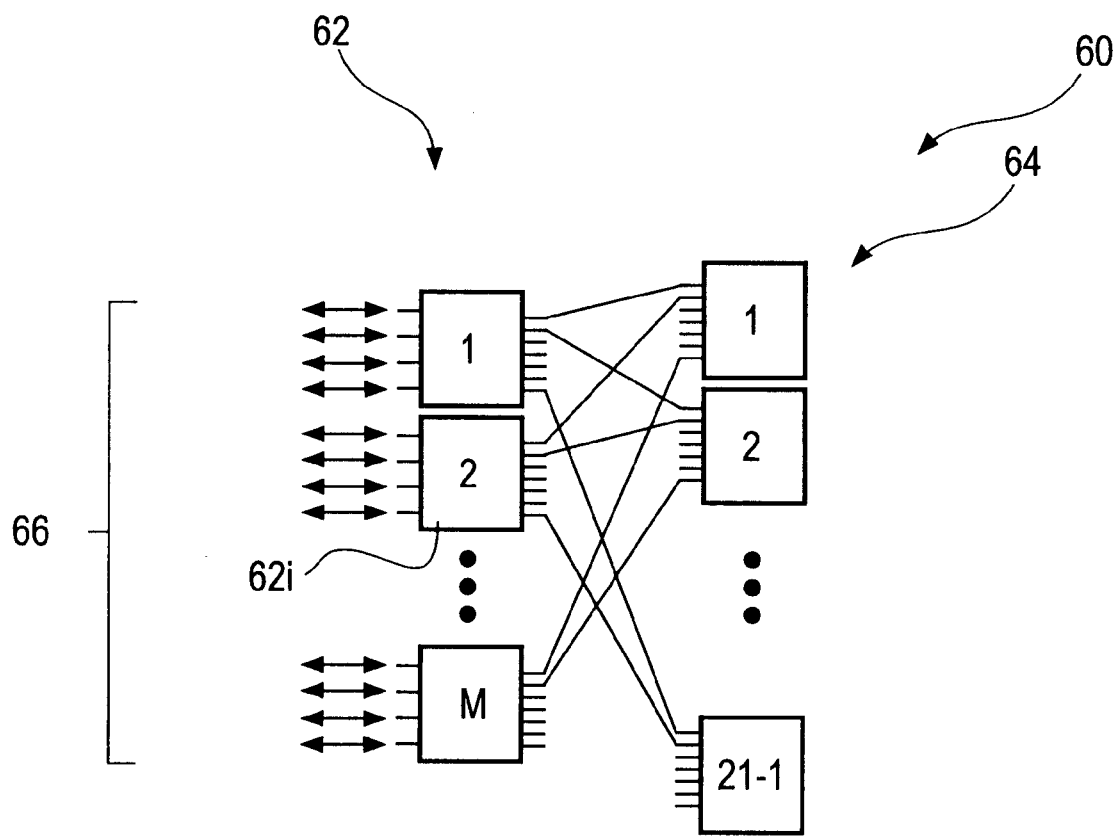
FIG. 5 is a multi-stage switch which incorporates switch modules in accordance herewith.

Switch configurations, such as 10a, 10b and 10c can be used as building blocks to create larger multi-stage switches for reciprocal traffic. FIG. 5 illustrates an exemplary multi-stage switch 60 of a known type as disclosed in published PCT application WO 00/14583, assigned to the assignee hereof.

As illustrated in FIG. 5, the switch 60 employs two groups of switching modules 62 and 64. The first group of modules 62 includes a plurality of (L,2L-1)-way modules 1-M. The (L,2L-1)-way modules 62 can be implemented in a variety of ways, as would be understood by those of skill in the art and are not a limitation of the present invention. The second group of modules 64 includes a plurality of M-way reciprocal switching modules 1-2L-1. The M-way modules 64 can be implemented in accordance with the principles of any of the modules described above in connection with FIGS. 2–4.

The modules 62 are connected to the modules 64 so the externally disposed I/O ports 66 handle reciprocal traffic in a non-blocking fashion. To this end, the modules are interconnected by optical fibers as illustrated in the exemplary switch 60 of FIG. 5. It will be understood that a variety of switch architectures using modules 10a, 10b, 10c, could be implemented in multi-stage switches to support reciprocal switch traffic without departing from the spirit and scope of the present invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A non-blocking optical switch comprising:
    a plurality of ports wherein each port has an optical input for receipt of an incident beam and an optical output from which a switched beam can exit;
    a plurality of multi-state switchable beam deflecting elements wherein the elements exhibit a deflecting condition and a non-deflecting condition and wherein a transmission path is establishable between first and second ports in a selected direction and between the same two ports in an opposite direction and wherein the path is established in at least one of a waveguide, free space and optical fiber.

2. A switch as in claim 1 which includes a plurality of deflecting only elements for bounding in part a transmission path associated with each of the ports.

3. A switch as in claim 2 wherein at least selected of the deflecting only elements define a transmission path back to a respective port.

4. A switch as in claim 3 wherein the selected elements reflect an incident light beam back to the respective port along the transmission path.

5. A switch as in claim 2 wherein transmission paths are bounded in part by at least a multi-state element and a deflecting only element.

6. A switch as in claim 1 wherein at least some of the ports have an associated deflecting only element.

7. A switch as in claim 6 wherein some of the ports have one or more associated multi-state deflecting elements.

8. A switch as in claim 1 which includes at least first and second pairs of ports with each pair configured so as to have at least one transmission path having substantially a common predetermined length.

9. A switch as in claim 1 wherein the number of multi-state elements is on the order of one-half the difference of the number of ports squared minus one.

10. A switch as in claim 1 wherein at least some of the multi-state elements comprise switchable mirrors.

11. A switch as in claim 1 wherein the ports are staggered relative to one another and wherein selected pairs of ports exhibit a common path length.

12. A switch as in claim 1 wherein the ports are staggered relative to one another and including at least one optical reversing element associated with at least one of the ports for providing a bidirectional transmission path to and from the respective port.

13. A switch as in claim 12 wherein selected pairs of ports exhibit a common path length and wherein a length of the bidirectional path is substantially the same as the common path length.

14. A switch as in claim 1 which includes control circuits for switching the multi-state elements.

15. A switch as in claim 1 wherein the multi-state elements comprise at least one of switchable reflectors, optical bubbles and holographic gratings.

16. A switch as in claim 15 wherein the switchable reflectors include movable mirrors.

17. A switch as in claim 15 wherein the switchable reflectors each include a mirror and a mechanically switching element movable relative to the mirror.

18. A switch as in claim 1 wherein the multi-state elements are selected from a class which includes switchable mirrors and solid state beam deflectors.

19. A switch as in claim 1 which includes at least one multi-state element and one deflecting only element in each possible path in the switch.

20. A switch as in claim 1 which has N inputs and wherein the plurality of switchable deflecting elements comprises $\{N*(N-1)/2\}-1$ elements.

21. A switch as in claim 20 wherein the deflecting elements are configured so as to provide transmission paths having substantially a common predetermined length.

22. A switch as in claim 20 wherein some of the transmission paths comprise a loop-back function.

23. A switch as in claim 20 which comprises N outputs co-located with the N inputs.

24. A switch as in claim 23 wherein some of the transmission paths comprise a loop-back function.

25. An optical switch comprising:
    a plurality of bidirectional optical ports coupled to a switching region;
    a plurality of fixed reflectors and switchable deflectors arranged within the region to support reciprocal traffic with respect to selected pairs of ports wherein the number of switchable deflectors comprises $\{N*(N-1)/2\}-1$ for N ports.

26. An optical switch as in claim 25 wherein the ports are configured, relative to the switching region, such that selected pairs of ports exhibit communications paths in the region which have substantially a common path length.

27. An optical switch as in claim 25 wherein some of the ports have an associated fixed deflector to implement a loopback function at the selected ports.

28. An optical switch as in claim 25 wherein the switchable deflectors are selected from a class which includes electro-mechanical switching elements and solid state switching elements.

29. An optical switch as in claim 28 wherein the region is bounded by a housing which carries the ports and wherein control circuitry is coupled to the switchable deflectors.

30. A method of switching optical signals to and from a plurality of bidirectional ports comprising:
    injecting input signals from a pair of ports into a switching region;
    arranging in the region switchable optical deflectors on the order of one-half the square of the number of ports in the plurality; and
    deflecting the input signals, using a common path, to become output signals for the other of the ports in the pair using at least some of the deflectors.

31. A method as in claim 30 which includes staggering the ports so that each path of a selected pair of paths, has a common length.

32. A method as in claim 31 wherein each path is associated with a respective pair of ports.

33. A method as in claim 30 which includes providing a loop-back function for some of the ports.

34. A method as in claim 30 which includes coupling incoming optical signals to respective of the ports.

35. A method as in claim 30 which includes establishing a plurality of communication paths using the optical deflectors.

36. A method as in claim 35 which includes configuring the ports and the deflectors such that the paths exhibit substantially a common length.

37. A method as in claim 35 wherein the deflectors are configures to comprise $\{N*(N-1)/2\}-1$ for N ports.

38. A modular optical switch which includes a plurality of substantially identical switch modules for reciprocal traffic wherein each module is non-blocking and includes:
   a plurality of ports wherein each port can receive an incident beam and can emit a switched beam;
   a plurality of multi-state beam deflecting elements wherein the elements exhibit a deflecting condition and a non-deflecting condition and wherein a transmission path is establishable between first and second ports in a selected direction and between the same two ports in an opposite direction.

39. A switch as in claim 38 which has a first, multi-module stage wherein a plurality of ports therein support reciprocal traffic and wherein each module provides a selected switching function; and
   a second stage which comprises the plurality of switch modules wherein each of the switch modules is interconnected with members of the first stage.

40. A switch as in claim 39 wherein the plurality of beam deflecting elements for an N-port module comprises $\{N*(N-1)/2\}-1$.

41. A switch as in claim 39 wherein pairs of ports of the switch modules are configured to have a common optical transmission length within the respective module.

42. A switch as in claim 38 wherein the elements are selected from a class which includes optical deflecting bubbles, holographic gratings, solid state deflectors, and movable deflectors.

43. A switch as in claim 38 wherein intra-module beam transmission paths comprise at least one of free space, optical fibers and waveguides.

* * * * *